United States Patent
Kim et al.

(10) Patent No.: US 9,407,340 B2
(45) Date of Patent: Aug. 2, 2016

(54) METHOD AND APPARATUS FOR LATTICE REDUCTION WITH REDUCED COMPUTATIONAL COMPLEXITY

(71) Applicant: Samsung Electronics Co., Ltd., Suwon-si (KR)

(72) Inventors: Kyeong Yeon Kim, Hwaseong-si (KR); Ki Taek Bae, Hwaseong-si (KR); Ho Yang, Hwaseong-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 44 days.

(21) Appl. No.: 14/199,213

(22) Filed: Mar. 6, 2014

(65) Prior Publication Data

US 2014/0254727 A1    Sep. 11, 2014

(30) Foreign Application Priority Data

Mar. 6, 2013  (KR) .................... 10-2013-0024086

(51) Int. Cl.
   *H04L 1/02*   (2006.01)
   *H04B 7/04*   (2006.01)
   *H04B 7/06*   (2006.01)
   *H04L 25/03*  (2006.01)

(52) U.S. Cl.
   CPC ............ *H04B 7/0417* (2013.01); *H04B 7/0663* (2013.01); *H04L 25/03891* (2013.01)

(58) Field of Classification Search
   CPC .............. H04L 2025/03426; H04L 25/03242; H04L 25/0204; H04L 25/0242; H04L 25/0202; H04L 25/0246; H04B 7/0854; H04B 7/0413; H04B 7/0663
   USPC .................................................. 375/316, 340
   See application file for complete search history.

(56) References Cited

U.S. PATENT DOCUMENTS

| | | |
|---|---|---|
| 2006/0176971 A1 | 8/2006 | Nissani (Nissensohn) |
| 2007/0268981 A1 | 11/2007 | Heiskala |
| 2008/0013444 A1 | 1/2008 | Sandell |

(Continued)

FOREIGN PATENT DOCUMENTS

| | | |
|---|---|---|
| KR | 10-2009-0026157 A | 3/2009 |
| KR | 10-2011-0121287 A | 11/2011 |
| KR | 10-2012-0045606 A | 5/2012 |

OTHER PUBLICATIONS

Gestner, Brian, et al. "Incremental lattice reduction: motivation, theory, and practical implementation." *Wireless Communications*, IEEE Transactions on Nov. 1, 2012: 188-198.

(Continued)

*Primary Examiner* — Tesfaldet Bocure
(74) *Attorney, Agent, or Firm* — NSIP Law (57) ABSTRACT

Provided is a method and apparatus for lattice reduction with reduced computational complexity. The apparatus and method include calculating an R matrix using sorted QR decomposition, and conducting an R-value test using an R-value based on diagonal elements of the R matrix and a threshold value. The R matrix is an upper triangular matrix. The apparatus and method further execute a loop comprising a size reduction and a conditional update of a basis vector corresponding to a column element of the R matrix in response to the R-value being greater than or equal to the threshold value. The apparatus and method conduct another R-value test based on the R matrix comprising the updated basis vector in response to the basis vector being updated.

19 Claims, 8 Drawing Sheets

(56) References Cited

U.S. PATENT DOCUMENTS

| | | |
|---|---|---|
| 2008/0043864 A1 | 2/2008 | Fujii |
| 2009/0116588 A1 | 5/2009 | McNamara et al. |
| 2009/0196360 A1 | 8/2009 | Gan et al. |
| 2009/0196379 A1 | 8/2009 | Gan et al. |
| 2012/0114058 A1 | 5/2012 | Gan et al. |
| 2012/0183088 A1* | 7/2012 | Liao et al. .................... 375/267 |
| 2014/0185716 A1* | 7/2014 | Aubert ......................... 375/341 |
| 2014/0269880 A1* | 9/2014 | de Victoria ................... 375/231 |
| 2015/0039260 A1* | 2/2015 | Niskanen et al. ............. 702/141 |

OTHER PUBLICATIONS

Lenstra, Arjen Klaas, et al. "Factoring polynomials with rational coefficients." *Mathematische Annalen* 261.4 (1982): 515-534.

* cited by examiner

METHOD AND APPARATUS FOR LATTICE REDUCTION WITH REDUCED COMPUTATIONAL COMPLEXITY

CROSS-REFERENCE TO RELATED APPLICATION(S)

This application claims the benefit under 35 U.S.C. §119 (a) of Korean Patent Application No. 10-2013-0024086, filed on Mar. 6, 2013, in the Korean Intellectual Property Office, the entire disclosure of which is incorporated herein by reference for all purposes.

BACKGROUND

1. Field

The following description relates to a method and apparatus for lattice reduction with reduced computational complexity, and more particularly, to a method and apparatus for lattice reduction with reduced computational complexity, applicable to various systems.

2. Description of Related Art

A lattice is an array of spaced points repeating periodically, and may be defined as a linear combination of basis vectors. Lattice reduction aims to find a basis with short, nearly orthogonal basis vectors. Accordingly, a lattice may be represented in a simple structure by reducing a length of a basis vector, and used as a preprocessor in all problems directed to locating a short vector. For example, lattice reduction may be used as a preprocessor for quantized precoder design or maximum likelihood (ML) decoding in a wireless communication system. Also, lattice reduction may be used for color space estimation in image signal processing or location estimation in global positioning system (GPS) signal processing.

Accordingly, when lattice reduction is applied to various systems represented by a lattice, the systems and processes may be simplified. As a result, lattice reduction may reduce complexity when compared to an optimal algorithm, and exhibit improved performance over a low-complexity algorithm. However, usage of lattice reduction as a preprocessor may lead to a further increase in computational complexity, and in a worst case scenario, a computational complexity increment may be infinite in certain applications. At present, active studies are being conducted on lattice reduction with reduced computational complexity.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In accordance with an illustrative configuration, there is provided a method, including calculating an R matrix using sorted QR decomposition, wherein the R matrix is an upper triangular matrix; conducting an R-value test using an R-value based on diagonal elements of the R matrix and a threshold value; and executing a loop including a size reduction and a conditional update of a basis vector corresponding to a column element of the R matrix in response to the R-value being greater than or equal to the threshold value.

The method may also include conducting another R-value test based on the R matrix including the updated basis vector in response to the basis vector being updated.

The method may also include determining the R matrix corresponding to the R-value lower than the threshold value to be a lattice reduced R matrix in response to the R-value being less than the threshold value.

The executing of the loop may include performing a size reduction of the basis vector; calculating a Euclidean distance of the size reduced basis vector; and updating the basis vector in response to the Euclidean distance for the size reduced basis vector satisfying a preset condition.

The updating of the basis vector may include updating the basis vector using a column swap and a Givens rotation of the basis vector.

The determining that the basis vector may be updated includes executing the loop on a basis vector subsequent to the basis vector when the update of the basis vector is determined to fail.

The conducting of the R-value test may include calculating the R-value using a diagonal element of the R matrix.

The calculating of the R-value may include extracting a trace and a determinant of the R matrix based on the diagonal elements of the R matrix; and calculating the R-value using a ratio of the extracted trace and the extracted determinant.

The calculating of the R-value further may include extracting a minimal diagonal element of the R matrix; and calculating the R-value using the minimal diagonal element.

The method may also include using an orthogonality defect (OD) factor to define the R-value.

In accordance with another illustrative configuration, there is provided a method, including calculating an R matrix including an upper triangular matrix; executing a loop including a size reduction and a conditional update for a basis vector corresponding to a column element of the R matrix; and conducting an R-value test using an R-value based on a diagonal element of the R matrix and a threshold value in response to the basis vector being updated.

The calculating of the R matrix may be performed using QR decomposition.

The method may also include executing the loop based on the R matrix including the updated basis vector in response to the R-value test determining the R-value to be greater than or equal to the threshold value.

The method may also include determining the R matrix corresponding to the R-value lower than the threshold value to be a lattice reduced R matrix in response to the R-value test determining the R-value to be less than the threshold value.

In accordance with another illustrative configuration, there is provided a method, including calculating an R matrix including an upper triangular matrix; conducting an R-value test using an R-value based on a diagonal element of the R matrix and a threshold value; executing a loop including a size reduction and a conditional update for a basis vector corresponding to a column element of the R matrix in response to the R-value test determining the R-value to be greater than or equal to the threshold value; conducting the R-value test based on the R matrix including the updated basis vector in response to the R-value test determining the basis vector to be updated; determining the R matrix corresponding to the R-value lower than the threshold value to be a lattice reduced R matrix in response to the R-value test determining the R-value to be less than the threshold value.

The method may also include detecting a multiple input multiple output (MIMO) received symbol vector using the lattice reduced R matrix.

The calculating of the R matrix may be performed using sorted QR decomposition.

In accordance with an illustrative configuration, there is provided an apparatus, including an R matrix calculating unit configured to calculate an R matrix using sorted QR decomposition, wherein the R matrix is an upper triangular matrix; an R-value testing unit configured to conduct an R-value test using an R-value based on diagonal elements of the R matrix and a threshold value; and an executing unit configured to execute a loop including a size reduction and a conditional update of a basis vector corresponding to a column element of the R matrix in response to the R-value being greater than or equal to the threshold value.

The apparatus may also include a basis vector update determining unit configured to determine to update the basis vector by directing the R-value testing unit to conduct another R-value test based on the R matrix including the updated basis vector.

The apparatus may also include a lattice reduced R matrix determining unit configured to determine the R matrix corresponding to the R-value lower than the threshold value to be a lattice reduced R matrix in response to the R-value being less than the threshold value.

Other features and aspects will be apparent from the following detailed description, the drawings, and the claims.

BRIEF DESCRIPTION OF THE DRAWINGS

These and/or other aspects will become apparent and more readily appreciated from the following description of the embodiments, taken in conjunction with the accompanying drawings in which.

Throughout the drawings and the detailed description, unless otherwise described, the same drawing reference numerals will be understood to refer to the same elements, features, and structures. The relative size and depiction of these elements may be exaggerated for clarity, illustration, and convenience.

DETAILED DESCRIPTION

The following detailed description is provided to assist the reader in gaining a comprehensive understanding of the methods, apparatuses, and/or systems described herein. Accordingly, various changes, modifications, and equivalents of the methods, apparatuses, and/or systems described herein will be suggested to those of ordinary skill in the art. The progression of processing steps and/or operations described is an example; however, the sequence of and/or operations is not limited to that set forth herein and may be changed as is known in the art, with the exception of steps and/or operations necessarily occurring in a certain order. Also, description of well-known functions and constructions may be omitted for increased clarity and conciseness.

Figure 1:
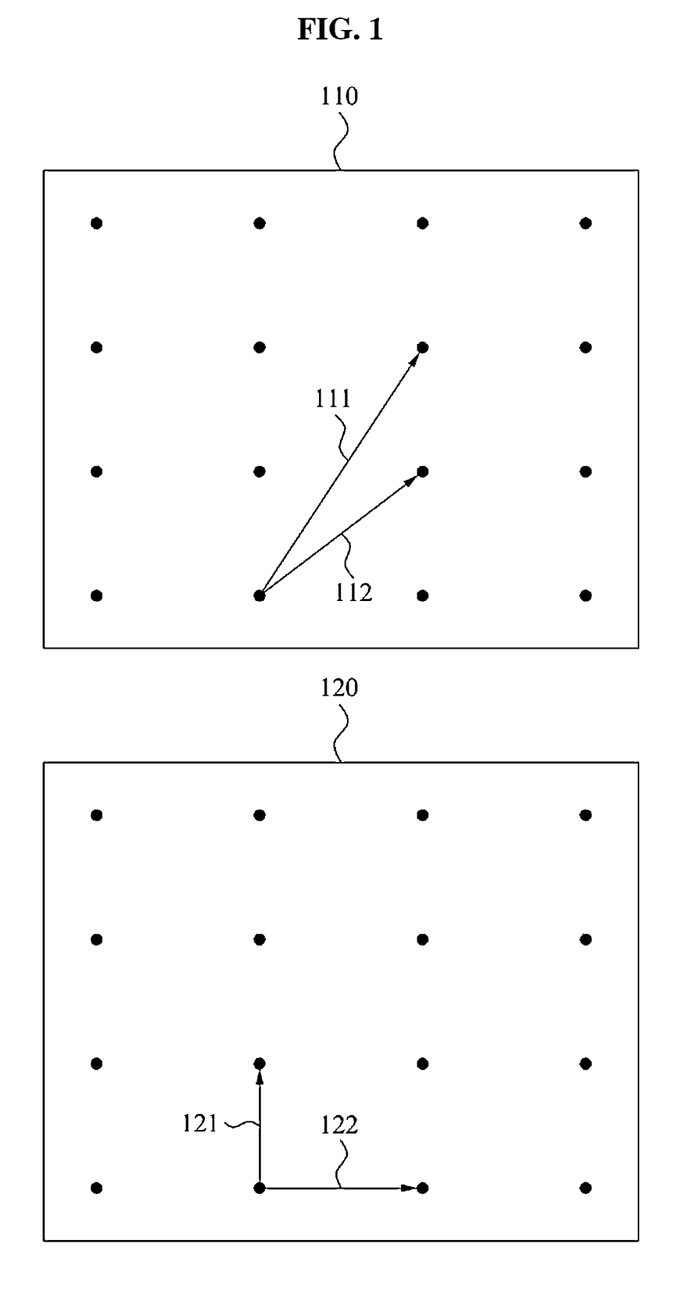
FIG. 1 illustrates a concept of a lattice reduction algorithm.

FIG. 1 illustrates a concept of a lattice reduction algorithm.

Referring to FIG. 1, basis vectors 111 and 112 of a given matrix, for example, an effective channel, may have various lengths and directions. Basis vectors may be used in various systems required for signal detection. When basis vectors are simply represented, various systems using the basis vectors may show the same performance at a lower processing rate.

In accordance with an illustrative example, a lattice reduction algorithm corresponds to a process of finding short and orthogonal basis vectors. For example, as shown in FIG. 1, absent use of lattice reduction, lattice reduced basis vectors 121 and 122 are shorter and more orthogonal than the basis vectors 111 and 112. For example, in a case of a linear detection technique, when a condition number of a channel gain matrix is large, noise may be amplified greatly when a received signal is multiplied by a weight value. Noise amplification would result in performance deterioration. In this instance, when the lattice reduced basis vectors 121 and 122 are used in a linear detection technique, a condition number of a channel matrix may be reduced compared with a case in which the basis vectors 111 and 112 are used absent lattice reduction.

A Lenstra-Lenstra-Lovasz (LLL) lattice basis reduction algorithm is an example of a lattice reduction algorithm, in which computational complexity of the LLL reduction algorithm may be a polynomial time. In one example, the computational complexity of the LLL reduction algorithm may correspond to a number of iterations of an LLL loop, and an average number of iterations of the LLL loop $O(N^2 \log N)$ may be bound by a polynomial time in which N denotes a number of independent rows and $\frac{1}{2} < t < 1$. In this instance, in a case of a system using an infinite vector length, computational complexity of an LLL reduction algorithm may be infinite.

To reduce computational complexity of an LLL reduction algorithm, effective LLL and relaxed LLL may be used. In one example, effective LLL performs a size reduction of a second off-diagonal element rather than all off-diagonal elements. Relaxed LLL reduces a number of updates of a basis vector by adjusting a conditional computation parameter based on a number of iterations of a loop. Also, to fix computational complexity of an LLL reduction algorithm, a fixed LLL and a parallel LLL may be used. For instance, the fixed LLL repeats an LLL loop in a fixed pattern of rows rather than in different rows each time a basis vector is updated. Also, the parallel LLL implements lattice reduction by repeating a QR decomposition and a size reduction. A QR decomposition or QR factorization of a matrix is a decomposition of a matrix A into a product A=QR of an orthogonal matrix Q and an upper triangular matrix R.

Also, an incremental LLL may be used to reduce a number of iterations of an LLL loop in an LLL reduction algorithm. For instance, the incremental LLL executes a reliability assessment (RA) based on a detected signal. When reliability is high, the RA terminates the LLL reduction algorithm absent further iteration of the LLL loop. In the RA, the lower a Euclidean distance in a lattice reduced domain is when compared to a preset threshold value, the higher a reliability. To calculate the Euclidean distance in the lattice reduced domain, RA in an incremental LLL may be represented by Equation 1.

$$RA: \|y - H\hat{s}\| \leq A\sigma_w \qquad \text{[Equation 1]}$$

In this equation, y denotes a received signal vector, and H denotes a given matrix. Also, ŝ denotes a detected symbol vector, and $A\sigma_w$ denotes a preset threshold value. In this instance, RA is implemented by determining whether the Euclidean distance calculated using the received signal vector y and the detected signal vector ŝ is less than or equal to the preset threshold value $A\sigma_w$.

The RA may be specified by Equation 2.

$$\|R\hat{z} - b\|^2 \le \frac{A^2 \sigma_w^2}{4}, \text{ where } b \equiv \frac{Q^H y + Rg}{2}, \quad \text{[Equation 2]}$$

$$g \equiv T^{-1}(1+j)1_{Nt \times 1}$$

In this example, each of R, Q, and T denotes an updated matrix resulting from execution of an LLL loop, and a vector g denotes an updated vector resulting from execution of the LLL loop. Also, b denotes a linearly equalized signal and denotes a detected signal vector. Also, $$\frac{A^2 \sigma_w^2}{4}$$

denotes a preset threshold value, and y denotes a received signal vector. In this example, when a basis vector update is successful, the linearly equalized signal b is updated using the updated matrix and the updated vector. Also, the detected signal vector ẑ may be calculated using the updated signal b. Because the incremental LLL uses a detected signal for RA, a multiple input multiple output (MIMO) received symbol vector detection may be provided within a loop in response to the incremental LLL being used as a preprocessor in the MIMO system. Accordingly, the incremental LLL reduces a number of iterations of an LLL loop. However, the incremental LLL detects an MIMO received signal vector each time a basis vector is updated, which may lead to additional operational processing.

Figure 2:
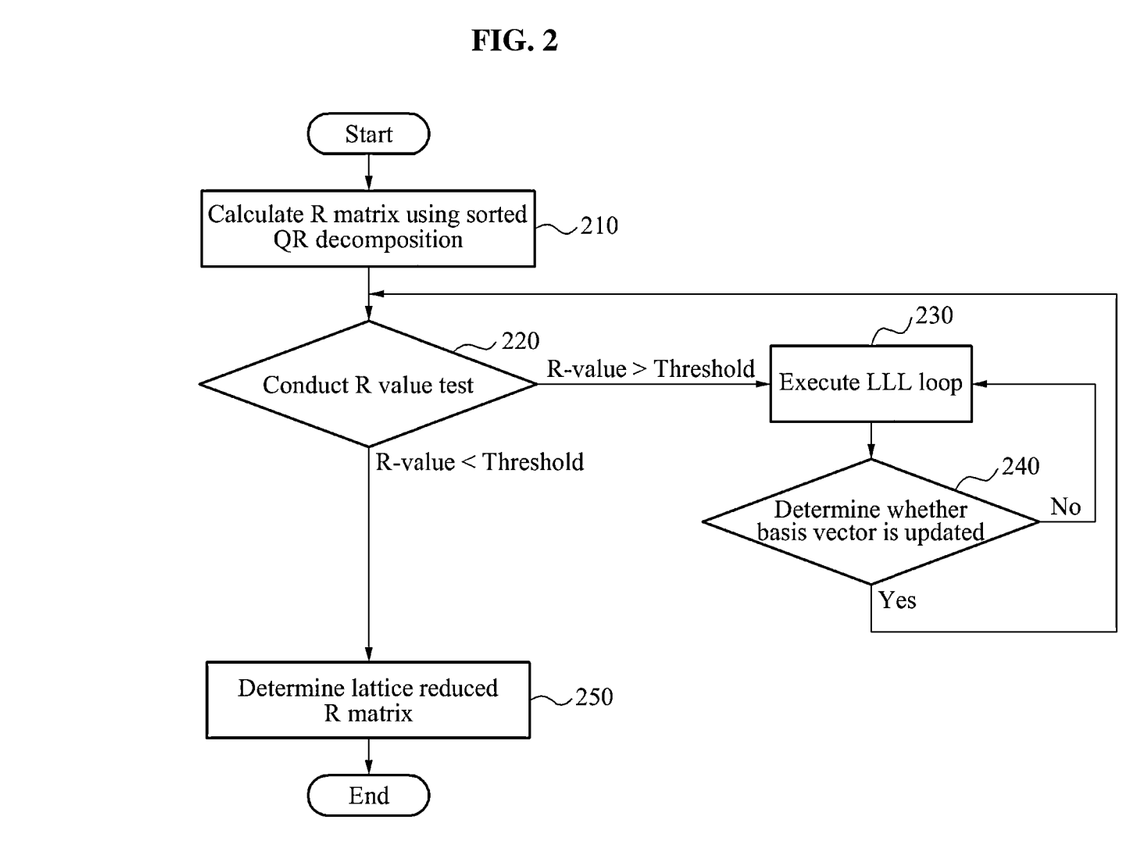
FIG. 2 illustrates a method for lattice reduction with reduced computational complexity, in accordance with an embodiment.

FIG. 2 illustrates a method for lattice reduction with reduced computational complexity in accordance with an embodiment.

At operation 210, the method calculates an R matrix for a given matrix using sorted QR decomposition in which the R matrix corresponds to an upper triangular matrix. In one example, the given matrix may be used in various systems implementing the method for lattice reduction with reduced computational complexity. For example, the given matrix corresponds to an effective channel matrix in response to the method for lattice reduction with reduced computational complexity being applied to a MIMO system.

In a configuration, the method for lattice reduction performs a sorted QR decomposition of a given channel. In this configuration, the method for lattice reduction calculates an R matrix through the sorted QR decomposition. Also, in response to the method for lattice reduction being performed using the calculated R matrix, a number of iterations of an LLL loop, to be described below, and overall computational complexity are reduced. In accordance with an embodiment, the R matrix corresponds to an upper triangular matrix, and represents a basis vector.

At operation 220, the method for lattice reduction conducts an R-value test using an R-value based on a diagonal element of the R matrix and a preset threshold value. Conducting of the R-value test indicates that an R matrix resulting from basis vector update may be used to determine whether to iterate an LLL loop, while eliminating the need for a separate external factor, for example, a detected signal in a MIMO system. Accordingly, the method for lattice reduction reduces a number of iterations of an LLL loop and, consequently, reduces the entire computational complexity.

In the R-value test, the method for lattice reduction calculates the R-value based on the diagonal elements of the R matrix. In one example, the R-value is configured to determine a lattice reduced R matrix of an output of the method for lattice reduction. To define the R-value, an orthogonality defect (OD) factor may be taken into account. In one example, the orthogonality defect factor refers to a criterion to determine whether the method for lattice reduction is performed properly. In this example, the orthogonality defect factor after performing the method for lattice reduction is represented by Equation 3.

$$\prod_i \|r_i\|_2 / \sqrt{\det(R^H R)} \ge 1 \quad \text{[Equation 3]}$$

In this example, det(A) denotes a determinant of a matrix A, and $\|r_i\|_2$ denotes a norm L2 of an i-th row of the matrix R. Also, based on an arithmetic geometric mean in the orthogonality defect factor and that the norm L2 is less than a norm L1, an upper bound of the orthogonality defect factor may be extracted. The upper bound of the orthogonality defect factor is represented by Equation 4.

$$OD \le C \left(\frac{1}{Nt} \sum_i |r_{i,i}|\right)^{Nt} / |\det(R)| = \quad \text{[Equation 4]}$$

$$C \left(\frac{1}{Nt} \sum_i |r_{i,i}| / \sqrt[Nt]{\prod_i |r_{i,i}|}\right)^{Nt}$$

C denotes a constant. Also, Nt denotes a number of transmitting antennas and corresponds to a number of independent rows, and $$\frac{1}{Nt} \sum_i |r_{i,i}|$$

denotes a value close to 1. Accordingly, an approximated upper bound of the orthogonality defect factor may be expressed as a ratio of a normalized trace and a normalized determinant of the R matrix. In this example, when $$\frac{1}{Nt} \sum_i |r_{i,i}| \le (Nt)^{1/N-1}$$

is satisfied, an actual upper bound of the orthogonality defect factor is represented. However, to reduce computational complexity, the method for lattice reduction uses an approximated upper bound. Accordingly, the R-value is represented by Equation 5.

$$Ctr(|R|)/|\det(R)| \quad \text{[Equation 5]}$$

C denotes a constant. Also, tr(|R|) denotes a trace of the R matrix, and |det(R)| denotes a determinant of the R matrix. Accordingly, the R-value is calculated using a diagonal element of the R matrix resulting from an update of a basis vector update, that is, a ratio of the trace and the determinant of the R matrix, irrespective of other factors. Also, the R-value has a different value because of the diagonal elements of the R matrix change with the update of the basis vector.

Further, the method for lattice reduction calculates the R-value using a minimal diagonal element of the R matrix. The method for lattice reduction extracts the minimal diagonal element of the R matrix, and calculates the R-value using the extracted minimal diagonal element $$\min_i |r_{i,i}|$$

More particularly, the method for lattice reduction calculates the R-value using a value to maximize the minimal diagonal element. In this case, the R-value may be represented by $$\max(\min_i |r_{i,i}|).$$

Also, in accordance with an embodiment, the method for lattice reduction is applied to a fixed LLL or a parallel LLL having fixed computational complexity. In this case, the fixed LLL or the parallel LLL updates an entire row rather than iterating an LLL loop row by row. Accordingly, when the method for lattice reduction is applied to the fixed LLL or the parallel LLL, the R-value is calculated using a value $$\max(\min_i |r_{i,i}|)$$

to maximize the minimal diagonal element of the R matrix. This may be for maximizing a minimum signal to noise ratio (SNR).

Also, the method for lattice reduction compares the minimal diagonal element $\min_i |r_{i,i}|$ to a preset predetermined value, and represents, as the R-value, the minimal diagonal element greater than or equal to the preset predetermined value.

Also, the method for lattice reduction conducts the R-value test by comparing the R-value to the preset threshold value. In one example, the preset threshold value is set differently based on a configuration of a system to which the method for lattice reduction is applied.

At operation 230, as a result of the R-value test, when the R-value is determined to be greater than or equal to the preset threshold value, the method for lattice reduction executes an LLL loop including a size reduction and a conditional update for a basis vector corresponding to a column element of the R matrix. In one example, the R-value being greater than or equal to the preset threshold value may be indicative that the R matrix is invalid as a lattice reduced R matrix. Accordingly, the LLL loop generates a shorter, more orthogonal R matrix.

In one illustrative example, the LLL loop includes a size reduction and an update of a basis vector. The size reduction refers to transformation of the basis vector to a vector having shorter and more orthogonal properties. Also, when a sized reduced basis vector is created, correlation between basis vectors may be reduced. In accordance with an embodiment, the method for lattice reduction performs the size reduction in an ascending order from a basis vector corresponding to a last column of the R matrix. In the alternative, the method for lattice reduction performs the size reduction in a descending order from a basis vector corresponding to a first column of the R matrix.

Also, the method for lattice reduction updates the basis vector only when a particular condition is satisfied. More particularly, the method for lattice reduction calculates a Euclidean distance for the size reduced basis vector. When the Euclidean distance for the size reduced basis vector satisfies a preset condition, the method for lattice reduction updates the basis vector. In one example, the preset condition is set using a preset Euclidean distance. For example, when the preset condition is set to update the basis vector when the Euclidean distance for the size reduced basis vector is less than the preset Euclidean distance, the method for lattice reduction updates the basis vector when the preset condition is satisfied.

Also, the update of the basis vector is performed using a column swap and a Givens rotation of the basis vector. When the size reduced basis vector satisfies the preset condition, the method for lattice reduction exchanges the size reduced basis vector and a next basis vector of the basis vector. In this instance, when the size reduction is performed from a basis vector corresponding to a last column, the next basis vector corresponds to a basis vector having a number of columns decreased by a value of one from that of the size reduced basis vector. When the size reduction is performed from a basis vector corresponding to a first column, the next basis vector corresponds to a basis vector having a column number increased by one from that of the size reduced basis vector. Also, after the column swap is completed, the upper triangular matrix is maintained using a Givens rotation because the R matrix corresponds to an upper triangular matrix.

At operation 240, the method for lattice reduction determines whether the basis vector is updated. More particularly, when the size reduced basis vector in the LLL loop satisfies the preset condition, the method for lattice reduction updates the basis vector. When the basis vector fails to satisfy the preset condition, even though the basis vector is reduced in size, the method for lattice reduction fails the update. Also, the method for lattice reduction determines whether to continue based on whether the basis vector resulting from the execution of the LLL loop is updated.

When the update of the basis vector is determined to fail, the method for lattice reduction executes the LLL loop on a next basis vector of the basis vector. In the same manner as the LLL loop executed on the basis vector, the method for lattice reduction performs a size reduction of the next basis vector. In response to a Euclidean distance for the size reduced next basis vector satisfying the preset condition, the method for lattice reduction updates the next basis vector. Also, based on whether the next basis vector is updated, the method for lattice reduction determines whether to iterate the LLL loop or whether to continue to proceed.

Also, when the basis vector is determined to be updated, the method for lattice reduction continues absent an iteration of the LLL loop for a next basis vector.

When the basis vector is updated, the method for lattice reduction conducts the R-value test based on the R matrix including the updated basis vector. Accordingly, the R-value test may be conducted again for the R matrix including the updated basis vector that is shorter and more orthogonal than that of the initial R matrix.

As a result of the R-value test, when the R-value is determined to be greater than or equal to the preset threshold value, the method for lattice reduction executes the LLL loop and returns to operation 230. Accordingly, the method for lattice reduction performs a size reduction and a conditional update for the R matrix including the updated basis vector. Also, the method for lattice reduction determines whether the basis vector is updated, and when the basis vector is determined to be updated, conducts the R-value test again for the R matrix including the updated basis vector. This iteration may be performed until the R-value is less than the preset threshold value.

At operation 250, as a result of the R-value test, when the R-value is determined to be less than the preset threshold value, the method for lattice reduction determines the R matrix, corresponding to the R-value lower than the preset threshold value, to be a lattice reduced R matrix. In one example, the R-value less than the preset threshold value suggests that the R matrix is sufficient to be the lattice reduced R matrix. Accordingly, the method for lattice reduction determines the basis vector updated R matrix to be the lattice reduced R matrix, while eliminating the need for further iteration of the LLL loop. In a system to which the method for lattice reduction is applied, a Q matrix corresponding to the lattice reduced R matrix may be calculated using the lattice reduced R matrix. Using the Q matrix and the R matrix, a result may be produced based on a goal of the system.

Also, the method for lattice reduction may be applied to an MIMO system. More particularly, the method for lattice reduction in the MIMO system calculates an R matrix for an effective channel using sorted QR decomposition, and conducts an R-value test using an R-value based on a diagonal element of the R matrix and a preset threshold value. As a result of the R-value test, when the R-value is determined to be greater than or equal to the preset threshold value, the method for lattice reduction in the MIMO system executes an LLL loop including a size reduction and a conditional update for a basis vector corresponding to a column element of the R matrix. Also, the method for lattice reduction in the MIMO system determines whether the basis vector is updated. As a result of the determination, in response to the basis vector being updated, the method for lattice reduction conducts an R-value test based on the R matrix including the updated basis vector. Also, as a result of the R-value test, when the R-value is less than the preset threshold value, the method for lattice reduction determines the R matrix less than the preset threshold value to be a lattice reduced R matrix. This determination may include the same feature as the method for lattice reduction as previously described. Also, the method for lattice reduction detects a MIMO received symbol vector using the lattice reduced R matrix. That is, a Q matrix corresponding to the lattice reduced R matrix is generated using the lattice reduced R matrix. Using the Q matrix and the R matrix, the MIMO received symbol vector is created. Accordingly, using the MIMO received symbol detection in the last operation reduces computational complexity.

Figure 3:
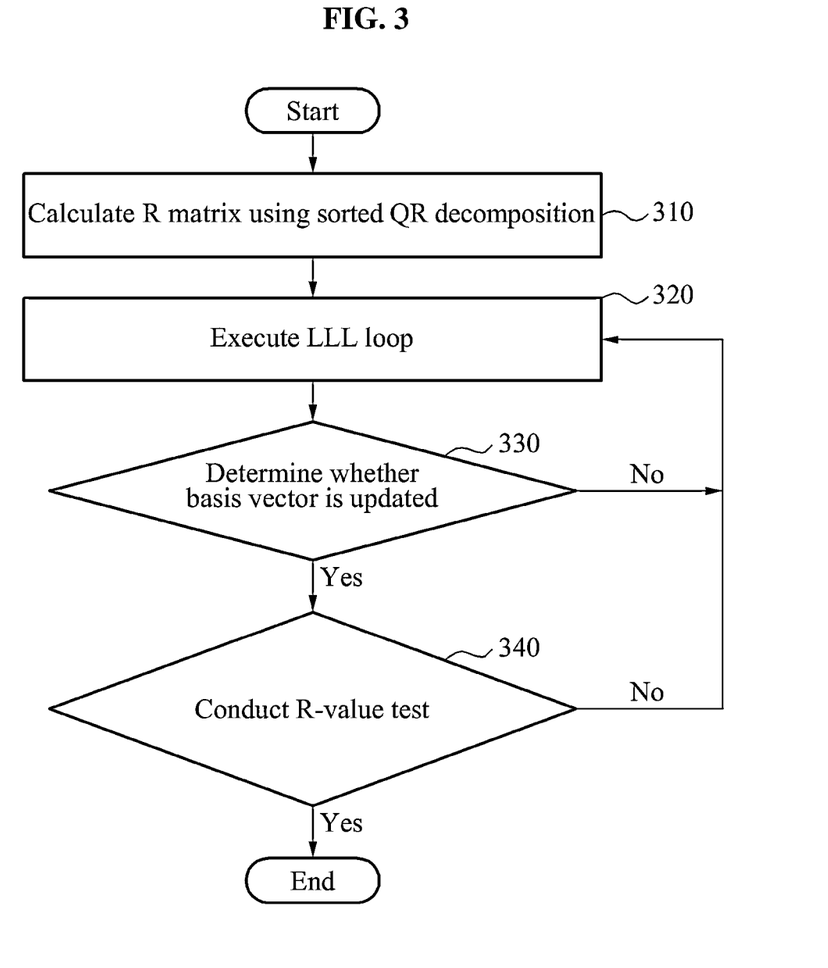
FIG. 3 illustrates a method for lattice reduction with reduced computational complexity using QR decomposition in accordance with an embodiment.

FIG. 3 illustrates a method for lattice reduction with reduced computational complexity using QR decomposition in accordance with an exemplary embodiment.

Referring to FIG. 3, at operation 310, the method for lattice reduction calculates an R matrix for a given matrix in which the R matrix corresponds to an upper triangular matrix.

At operation 320, the method for lattice reduction executes an LLL loop including a size reduction and a conditional update for a basis vector corresponding to a column element of the R matrix.

At operation 330, the method for lattice reduction determines whether the basis vector is updated.

At operation 340, the method for lattice reduction conducts an R-value test using an R-value based on a diagonal element of the R matrix and a preset threshold value when the basis vector is determined to be updated. More particularly, as a result of the R-value test, when the R-value is determined to be greater than or equal to the preset threshold value, the method for lattice reduction executes the LLL loop again (operation 320), based on the R matrix including the updated basis vector. Also, the method for lattice reduction determines whether the basis vector is updated, and conducts the R-value test again (operation 340) based on the R matrix including the updated basis vector. This iteration may be performed until the R-value is less than the preset threshold value.

As a result of the R-value test, when the R-value is determined to be less than the preset threshold value, the method for lattice reduction determines the R matrix being less than the preset threshold value to be a lattice reduced R matrix. Accordingly, the method for lattice reduction determines the R matrix to be the lattice reduced R matrix absent re-execution of the LLL loop. Also, in a system to which the method for lattice reduction is applied, a Q matrix corresponding to the lattice reduced R matrix may be calculated. Using the Q matrix and the R matrix, a result may be executed depending on a system's application.

Figure 4:
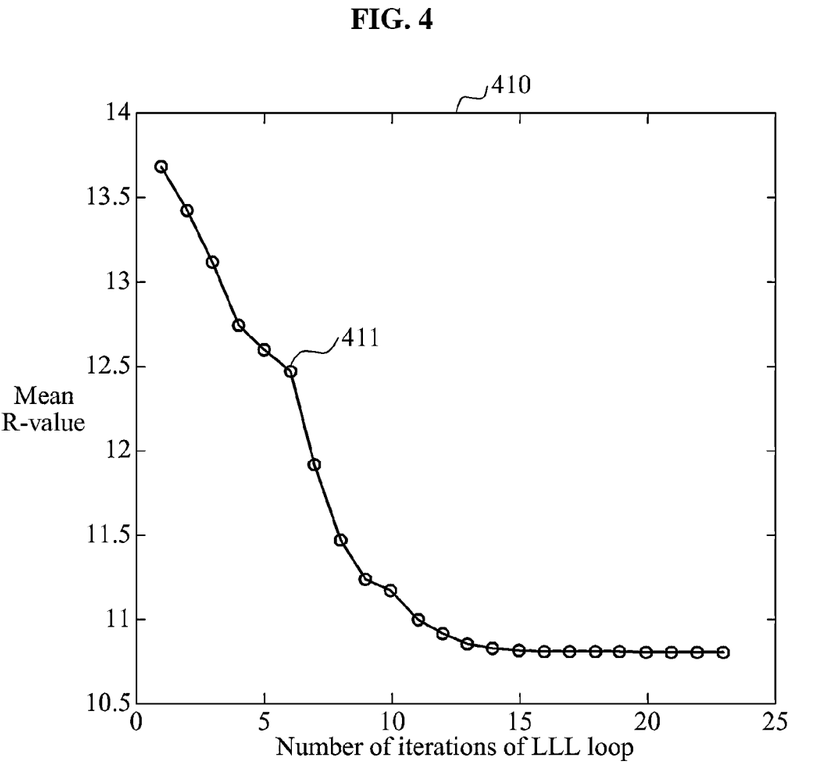
FIG. 4 illustrates a mean R-value against a number of iterations of a Lenstra-Lenstra-Lovasz (LLL) loop, in accordance with an embodiment.

FIG. 4 illustrates a mean R-value against a number of iterations of an LLL loop, in accordance with an embodiment.

Referring to FIG. 4, in a graph 410, an X axis denotes a number of iterations of an LLL loop, and a Y axis denotes a mean R-value. Also, nodes and edges 411 represent a change in the mean R-value based on the number of iterations of the LLL loop. The graph 410 shows a decrease in a mean R-value with an increasing number of iterations of an LLL loop. In this example, the R-value is not influenced by the execution of the size reduction, which suggests that the R-value may be reduced as a number of updates of a basis vector increases. Accordingly, to reduce computational complexity, the method for lattice reduction with reduced computational complexity makes a determination about an R-value when a basis vector resulting from the execution of the LLL loop is updated.

Figure 5:
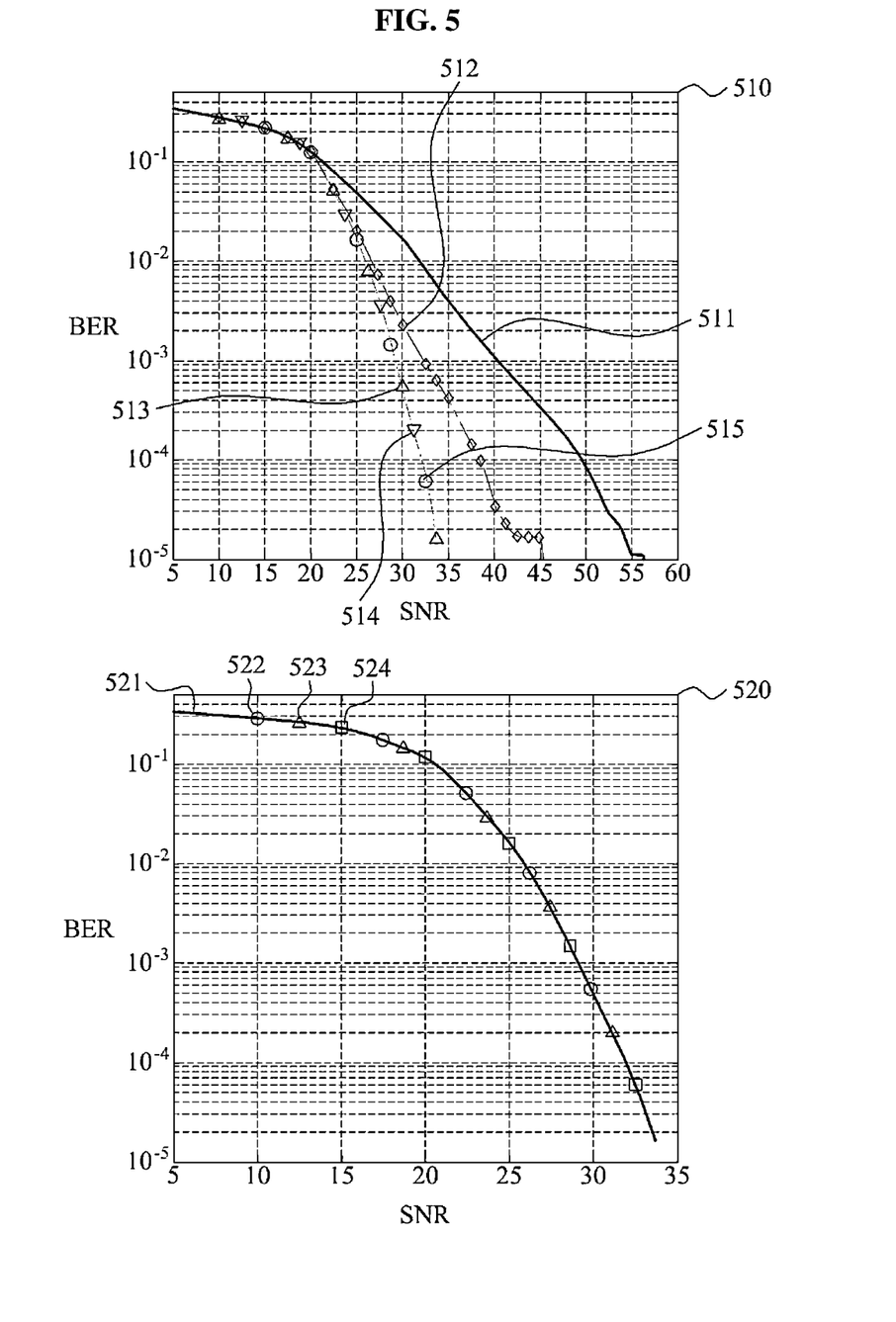
FIGS. 5 and 6 illustrate uncoded bit error probability performance of a method for lattice reduction with reduced computational complexity, in accordance with an embodiment, in a multiple input multiple output (MIMO) system.
Figure 6:
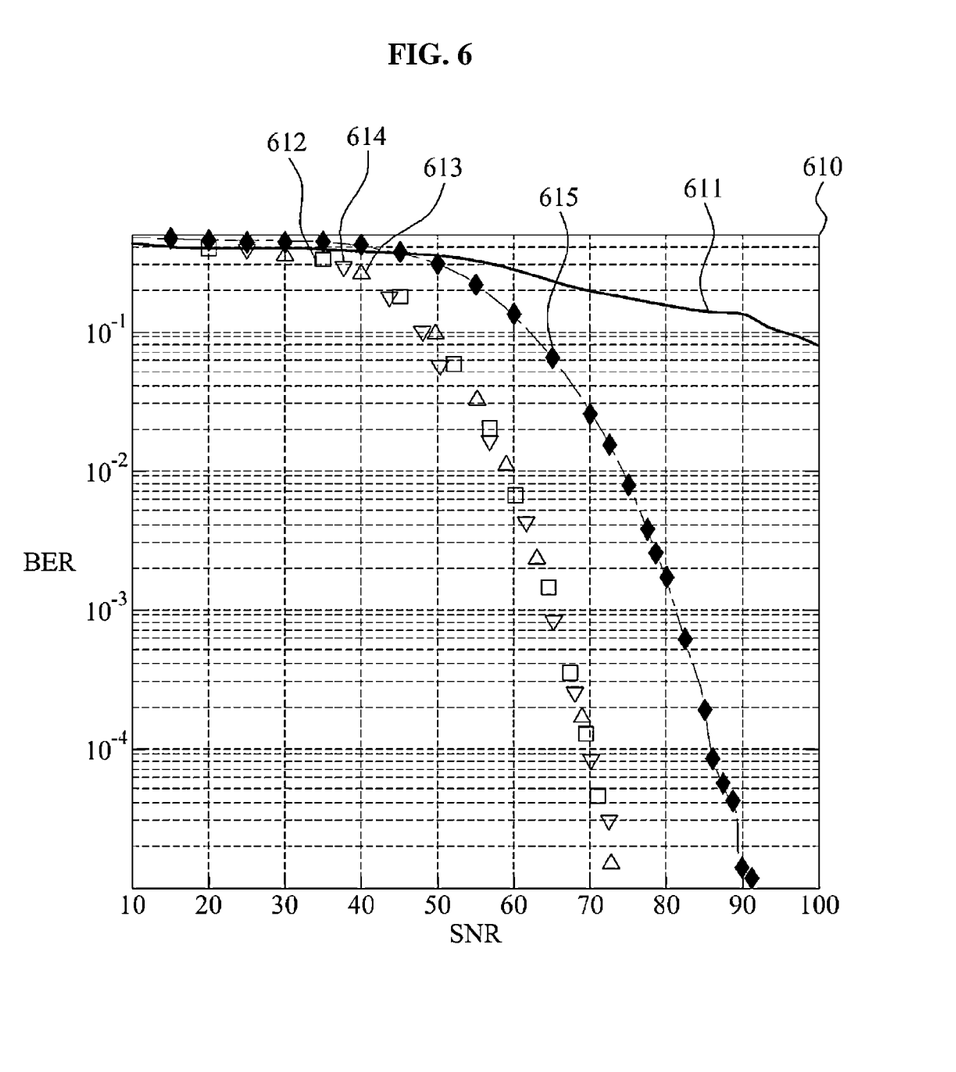

FIGS. 5 and 6 illustrate uncoded bit error probability performance of a method for lattice reduction with reduced computational complexity, in accordance with an embodiment in an MIMO system.

Referring to FIG. 5, a graph 510 illustrates a lattice reduction algorithm using minimum mean square error (MMSE)-successive interference cancellation (SIC). The graph 510 includes an MMSE-SIC edge 511 based on the method for lattice reduction with reduced computational complexity, a double-sorted low complexity lattice-reduced decision-feedback (DOLLAR) node 512, an MMSE-SIC node 513 considering an original LLL, an MMSE-SIC node 514 considering an incremental LLL, and an MMSE-SIC node 515 based on the method for lattice reduction with reduced computational complexity. The DOLLAR node 512 corresponds to MMSE-SIC through a sorted QR decomposition and a size reduction being performed twice. Also, in the graph 510, an X axis denotes an SNR in decibels (dB) and a Y axis denotes an uncoded bit error probability to a degree of $1.0 \times 10^{-4}$, for example, a bit error rate (BER).

In the graph 510, when compared to the MMSE-SIC edge 511 based on the method for lattice reduction with reduced computational complexity, the MMSE-SIC node 515 using the method for lattice reduction with reduced computational complexity obtains a gain of 18 dB. When compared to the DOLLAR node 512, the MMSE-9SIC node 515 based on the method for lattice reduction with reduced computational complexity obtains a gain of 7 dB. Also, the nodes 513 through 515 may exhibit the same performance, which suggests that the method for lattice reduction with reduced computational complexity avoids performance deterioration with reduced computational complexity.

A graph 520 illustrates the performance when the method for lattice reduction with reduced computational complexity is applied to a fixed LLL and a parallel LLL. Similar to the graph 510, an X axis denotes an SNR and a Y axis denotes a BER. Also, edges and nodes of the graph 520 represent MMSE-SIC based on the method for lattice reduction with reduced computational complexity. More particularly, the graph 520 includes an MMSE-SIC edge 521 based on a original LLL, an MMSE-SIC node 522 based on an incremental LLL, an MMSE-SIC node 523 based on the fixed LLL to which the method for lattice reduction with reduced computational complexity is applied, and an MMSE-SIC 524 based on the parallel LLL to which the method for lattice reduction with reduced computational complexity is applied. In this instance, the node 523 and the node 524 perform the method for lattice reduction until a minimal diagonal element among diagonal elements of an R matrix no longer increases.

In the graph 520, the edge 521 and the nodes 522 through 524 exhibit the same trend, which suggest that the fixed LLL and the parallel LLL, to which the method for lattice reduction with reduced computational complexity is applied, have the same performance as those of the LLL and the incremental LLL. Accordingly, the fixed LLL and the parallel LLL, to which the method for lattice reduction with reduced computational complexity is applied, avoids performance deterioration with reduced computational complexity.

Referring to FIG. 6, a graph 610 illustrates a lattice reduction algorithm using MMSE-SIC in a channel having a high spatial correlation. The graph 610 includes an MMSE-SIC edge 611 based on the method for lattice reduction with reduced computational complexity, an MMSE-SIC node 612 based on the method for lattice reduction with reduced computational complexity, an MMSE-SIC node 613 based on an incremental LLL, an MMSE-SIC node 614 based on an original LLL, and a Kbest node 615. In the graph 610, an X axis denotes an SNR in dB and a Y axis denotes a BER.

In one example, the method for lattice reduction with reduced computational complexity may be more favorable to improve performance as a spatial correlation increases. As shown the graph 610, in a case of a channel having a high spatial correlation in a long term evolution network (LTE), reception performance of the MMSE-SIC node 612 considering the method for lattice reduction with reduced computational complexity increases by about 16 dB compared with reception performance of the MMSE-SIC edge 611 and the Kbest node 615. Also, the MMSE-SIC node 612 using the method for lattice reduction with reduced computational complexity has a similar performance as the MMSE-SIC nodes 613 and 614 using original lattice reduction methods.

Figure 7:
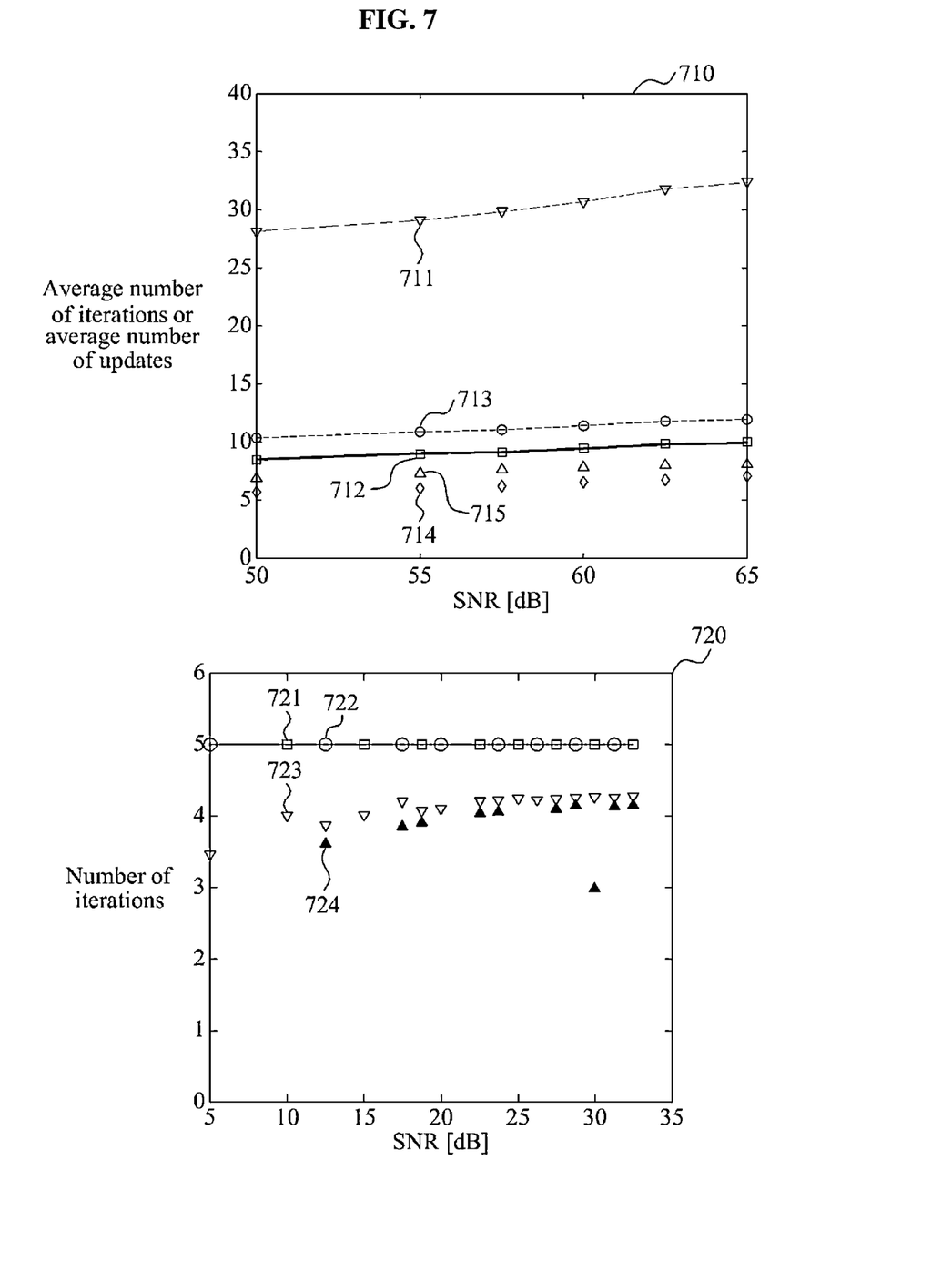
FIG. 7 illustrates computational complexity of a method for lattice reduction with reduced computational complexity, in accordance with an embodiment.

FIG. 7 illustrates computational complexity of a method for lattice reduction with reduced computational complexity, in accordance with an embodiment.

Referring to FIG. 7, a graph 710 includes an original LLL edge 711, a node 712 associated with a number of iterations of an LLL loop of an incremental LLL, and a basis vector update node 714. The graph 710 also includes a node 713 associated with a number of iterations of an LLL loop of the method for lattice reduction with reduced computational complexity, and a basis vector update node 715. Also, an X axis denotes an SNR and a Y axis denotes an average number of iterations of an LLL loop or an average number of basis vector updates.

In the graph 710, the node 713 associated with a number of iterations of an LLL loop of the method for lattice reduction with reduced computational complexity is reduced by a value of about one third in comparison with the original lattice reduction method 711. However, the node 713 associated with a number of iterations of an LLL loop of the method for lattice reduction with reduced computational complexity increases by a value of about one or two when compared to a number of iterations of an LLL loop of the incremental LLL, because an R-value of the method for lattice reduction with reduced computational complexity purely considers characteristics of a channel. However, because the method for lattice reduction with reduced computational complexity does not involve iterative MIMO signal detection, the entire computation complexity of the method for lattice reduction with reduced computational complexity obtains a computational complexity gain of about 1.5 times in a 4×4 MIMO. Also, the method for lattice reduction with reduced computational complexity obtains a computational complexity gain with an increasing number of antennas when compared to the incremental LLL because the basis vector update is performed with fixed computational complexity. However, computational complexity of MIMO detection increases with an increasing number of antennas. Also, in one example, the method for lattice reduction with reduced computational complexity may work for varying channels, in view of an inherent advantage of lattice reduction when lattice reduction is used as a preprocessor for slow fading channels. In contrast, even though a channel changes slowly, the incremental LLL may increase computational complexity compared with an original lattice reduction because the incremental LLL is related to a signal vector.

In hardware design, the method for lattice reduction with reduced computational complexity may interwork, as a preprocessor, with various MIMO detectors. However, in some configurations, the incremental LLL may need different hardware designs based on a detection algorithm due to integration of lattice reduction and MIMO detection rather than implementation as a preprocessor. Also, as complexity of a detection algorithm increases, computational complexity of lattice reduction in the incremental LLL may increase.

A graph 720 illustrates computational complexity in a case in which the method for lattice reduction with reduced computational complexity is applied to a fixed LLL and a parallel LLL. More particularly, the graph 720 includes a parallel LLL node 721, a fixed LLL node 722, a parallel LLL node 723 to which the method for lattice reduction with reduced computational complexity is applied, and a fixed LLL node 724 to which the method for lattice reduction with reduced computational complexity is applied. Similarly, an X axis denotes an SNR and a Y axis denotes a number of iterations. In one example, when the method for lattice reduction with reduced computational complexity is applied, the fixed LLL may obtain a computational complexity gain of 22% and the parallel LLL may obtain a computational complexity gain of 18%, suggesting that, when the method for lattice reduction with reduced computational complexity is applied, performance deterioration may be avoided with reduced computational complexity.

Figure 8:
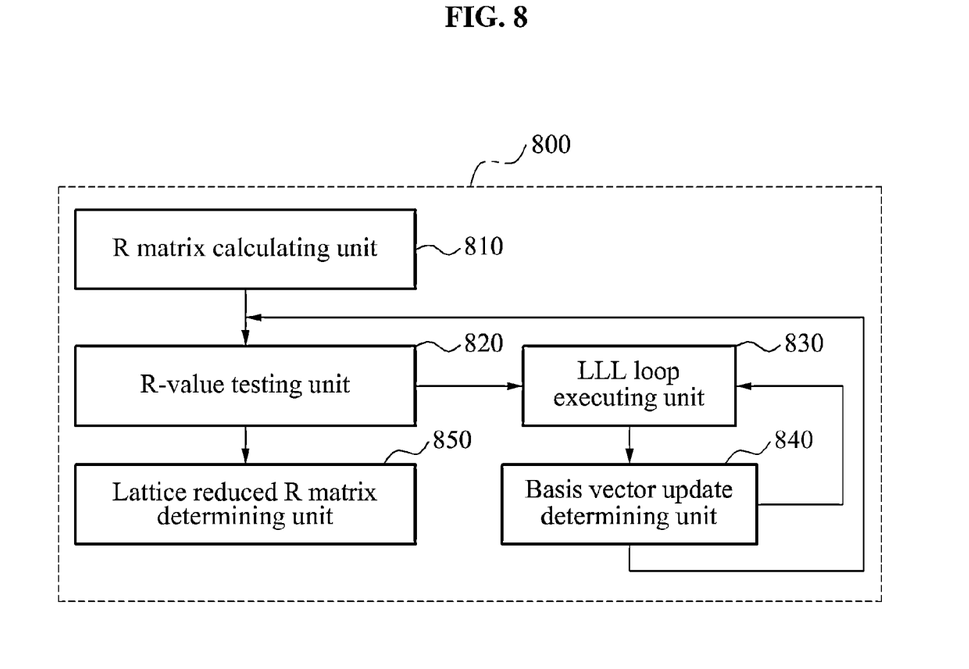
FIG. 8 illustrates an apparatus for lattice reduction with reduced computational complexity, in accordance with an embodiment.

FIG. 8 illustrates an apparatus for lattice reduction with reduced computational complexity 800 in accordance with an exemplary embodiment.

Referring to FIG. 8, an R matrix calculating unit 810 calculates an R matrix for a given matrix using sorted QR decomposition, in which the R matrix corresponds to an upper triangular matrix.

An R-value testing unit 820 conducts an R-value test using an R-value based on a diagonal element of the R matrix and a preset threshold value.

An LLL loop executing unit 830 executes an LLL loop including a size reduction and a conditional update for a basis vector corresponding to a column element of the R matrix when the result of the R-value test indicates that the R-value is greater than or equal to the preset threshold value.

A basis vector update determining unit 840 determines whether the basis vector is updated.

The R-value testing unit 820 conducts the R-value test again based on the R matrix including the updated basis vector when the basis vector is determined to be updated.

A lattice reduced R matrix determining unit 850 determines the R matrix corresponding to the R-value lower than the preset threshold value to be a lattice reduced R matrix when the R-value is determined to be less than the preset threshold value.

In accordance with an alternative configuration, the apparatus may be configured to reduce lattice with reduced computational complexity using QR decomposition, in accordance with an embodiment. The R matrix calculating unit 810 calculates an R matrix for a given matrix using QR decomposition, in which the R matrix may correspond to an upper triangular matrix. The LLL loop executing unit 830 executes an LLL loop including a size reduction and a conditional update for a basis vector corresponding to a column element of the R matrix. The basis vector update determining unit 840 determines whether the basis vector is updated. The R-value testing unit 820 conducts an R-value test using an R-value based on a diagonal element of the R matrix and a preset threshold value when the basis vector is determined to be updated.

In accord with another alternative configuration, the apparatus may be configured to reduce lattice with reduced computational complexity in an MIMO system in accordance with an embodiment. The R matrix calculating unit 810 calculates an R matrix for an effective channel using sorted QR decomposition, in which the R matrix corresponds to an upper triangular matrix. The R-value testing unit 820 conducts an R-value test using an R-value based on a diagonal element of the R matrix and a preset threshold value. The LLL loop executing unit 830 executes an LLL loop including a size reduction and a conditional update for a basis vector corresponding to a column element of the R matrix when the R-value is determined to be greater than or equal to the preset threshold value. The basis vector update determining unit 840 determines whether the basis vector is updated. The R-value testing unit 820 conducts the R-value test based on the R matrix including the updated basis vector when the basis vector is determined to be updated. The lattice reduced R matrix determining unit 850 determines the R matrix corresponding to the R-value lower than the preset threshold value to be a lattice reduced R matrix when the R-value is determined to be less than the preset threshold value, as a result of the R-value test. A MIMO received symbol vector is detected using the lattice reduced R matrix. In one configuration, the MIMO received symbol vector may be detected at the lattice reduced R matrix determining unit 850 or at another detecting unit, internal or external to the apparatus 800.

The R matrix calculating unit 810, an LLL loop executing unit 830, a basis vector update determining unit 840, an R-value testing unit 820, and the lattice reduced R matrix determining unit 850, and the apparatus 800 described herein may be implemented using hardware components. The hardware components may include, for example, controllers, sensors, testers, processors, generators, drivers, and other equivalent electronic components. The hardware components may be implemented using one or more general-purpose or special purpose computers, such as, for example, a processor, a controller and an arithmetic logic unit, a digital signal processor, a microcomputer, a field programmable array, a programmable logic unit, a microprocessor or any other device capable of responding to and executing instructions in a defined manner. The hardware components may run an operating system (OS) and one or more software applications that run on the OS. The hardware components also may access, store, manipulate, process, and create data in response to execution of the software. For purpose of simplicity, the description of a processing device is used as singular; however, one skilled in the art will appreciated that a processing device may include multiple processing elements and multiple types of processing elements. For example, a hardware component may include multiple processors or a processor and a controller. In addition, different processing configurations are possible, such a parallel processors.

Furthermore, although the hardware or structural elements of FIG. 8 are illustrated as individual units, each unit may be combined with another unit or all units may be combined as a single structural unit.

The disclosure described with reference to FIGS. 1 through 7 may be applied to the apparatus for lattice reduction with reduced computational complexity 800 in accordance with an embodiment as shown in FIG. 8, an apparatus for lattice reduction with reduced computational complexity using QR decomposition in accordance with an exemplary embodiment, and an apparatus for lattice reduction with reduced computational complexity in an MIMO system in accordance with an embodiment, and thus, a further detailed description is omitted herein.

It is to be understood that in the embodiment of the present invention, the operations in FIGS. 2 and 3 are performed in the sequence and manner as shown although the order of some operations and the like may be changed without departing from the spirit and scope of the described configurations. In accordance with an illustrative example, a computer program embodied on a non-transitory computer-readable medium may also be provided, encoding instructions to perform at least the method described in FIGS. 2 and 3.

The methods in accordance with exemplary embodiments may be recorded, stored, or fixed in one or more non-transitory computer-readable storage media that includes program instructions to be implemented by a computer to cause a processor to execute or perform the program instructions. The media may also include, alone or in combination with the program instructions, data files, data structures, and the like. The media and program instructions may be those specially designed and constructed, or they may be of the kind well-known and available to those having skill in the computer software arts. Examples of non-transitory computer-readable media include magnetic media such as hard discs, floppy discs, and magnetic tape; optical media such as CD ROM discs and DVDs; magneto-optical media such as optical discs; and hardware devices that are specially configured to store and perform program instructions, such as read-only memory (ROM), random access memory (RAM), flash memory, and the like. Examples of program instructions include both machine code, such as produced by a compiler, and files containing higher level code that may be executed by the computer using an interpreter. The described hardware devices may be configured to act as one or more software modules in order to perform the operations and methods described above, or vice versa. In addition, a non-transitory computer-readable storage medium may be distributed among computer systems connected through a network and non-transitory computer-readable codes or program instructions may be stored and executed in a decentralized manner.

A number of examples have been described above. Nevertheless, it should be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A method for lattice reduction with reduced computational complexity, comprising:
   calculating, using an R matrix calculator, an R matrix using sorted QR decomposition, wherein the R matrix is an upper triangular matrix;
   conducting, using an R-value tester, an R-value test comprising using a threshold value and an R-value based on diagonal elements of the R matrix calculated at the R matrix calculator;
   executing, at a loop executor, a loop comprising a size reduction and a conditional update of a basis vector corresponding to a column element of the R matrix in response to the R-value being greater than or equal to the threshold value to produce a lattice reduced R matrix; and
   detecting, using the lattice reduced R matrix, a multiple input multiple output (MIMO) symbol vector received at one or more MIMO antennas.

2. The method of claim 1, further comprising:
   conducting, using the R-value tester, another R-value test based on the R matrix comprising the updated basis vector in response to the basis vector being updated.

3. The method of claim 1, further comprising:
   determining, using a lattice reduced R matrix determiner, the R matrix corresponding to the R-value lower than the threshold value to be the lattice reduced R matrix in response to the R-value being less than the threshold value as a result of the R-value test.

4. The method of claim 1, wherein the executing of the loop at the loop executor further comprises:
   performing a size reduction of the basis vector;
   calculating a Euclidean distance of the size reduced basis vector; and
   updating the basis vector in response to the Euclidean distance for the size reduced basis vector satisfying a preset condition.

5. The method of claim 4, wherein the updating of the basis vector comprises updating the basis vector using a column swap and a Givens rotation of the basis vector.

6. The method of claim 2, wherein the determining that the basis vector is updated comprises executing the loop on a basis vector subsequent to the basis vector when the update of the basis vector is determined to fail.

7. The method of claim 1, wherein the conducting of the R-value test using the R-value tester further comprises calculating the R-value using a diagonal element among the diagonal elements the R matrix.

8. The method of claim 7, wherein the calculating of the R-value comprises:
   extracting a trace and a determinant of the R matrix based on the diagonal elements of the R matrix; and
   calculating the R-value using a ratio of the extracted trace and the extracted determinant.

9. The method of claim 7, wherein the calculating of the R-value further comprises:
   extracting a minimal diagonal element of the R matrix; and
   calculating the R-value using the minimal diagonal element.

10. The method of claim 1, further comprising:
    using an orthogonality defect (OD) factor to define the R-value.

11. A method for lattice reduction with reduced computational complexity, comprising:
    calculating, using an R matrix calculator, an R matrix comprising an upper triangular matrix;
    executing, at a loop executor, a loop comprising a size reduction and a conditional update for a basis vector corresponding to a column element of the R matrix calculated at the R matrix calculator;
    conducting, using an R-value tester, an R-value test using an R-value based on a diagonal element of the R matrix and a threshold value in response to the basis vector being updated to produce a lattice reduced R matrix; and
    detecting, using the lattice reduced R matrix, a multiple input multiple output (MIMO) symbol vector received at one or more MIMO antennas.

12. The method of claim 11, wherein the calculating of the R matrix at the R matrix calculator is performed using QR decomposition.

13. The method of claim 11, further comprising:
    executing, at the loop executor, the loop based on the R matrix comprising the updated basis vector in response to the R-value test determining the R-value to be greater than or equal to the threshold value.

14. The method of claim 11, further comprising:
    determining, using a lattice reduced R matrix determiner, the R matrix corresponding to the R-value lower than the threshold value to be the lattice reduced R matrix in response to the R-value test determining the R-value to be less than the threshold value.

15. A method for lattice reduction with reduced computational complexity, comprising:
    calculating, using an R matrix calculator, an R matrix comprising an upper triangular matrix;
    conducting, using an R-value tester, an R-value test using an R-value based on a threshold value and a diagonal element of the R matrix calculated at the R matrix calculator;
    executing, at a loop executor, a loop comprising a size reduction and a conditional update for a basis vector corresponding to a column element of the R matrix in response to the R-value test determining the R-value to be greater than or equal to the threshold value;
    conducting, using the R-value tester, the R-value test based on the R matrix comprising the updated basis vector in response to the R-value test determining the basis vector to be updated;
    determining, using a lattice reduced R matrix determiner, the R matrix corresponding to the R-value lower than the threshold value to be a lattice reduced R matrix in response to the R-value test determining the R-value to be less than the threshold value to reduce lattice; and
    detecting, using the lattice reduced R matrix, a multiple input multiple output (MIMO) symbol vector received at one or more MIMO antennas.

16. The method of claim 15, wherein the calculating of the R matrix at the R matrix calculator is performed using sorted QR decomposition.

17. An apparatus for lattice reduction with reduced computational complexity, comprising:
    an R matrix calculator configured to calculate an R matrix using sorted QR decomposition, wherein the R matrix is an upper triangular matrix;

an R-value tester configured to conduct an R-value test using a threshold value and an R-value based on diagonal elements of the R matrix calculated at the R matrix calculator;

a loop executor configured to execute a loop comprising a size reduction and a conditional update of a basis vector corresponding to a column element of the R matrix in response to the R-value being greater than or equal to the threshold value to produce a lattice reduced R matrix; and a multiple input multiple output (MIMO) detector comprising one or more MIMO antennas and configured to detect a MIMO symbol vector using the lattice reduced R matrix.

18. The apparatus of claim 17, further comprising:

a basis vector update determiner configured to determine to update the basis vector by directing the R-value tester to conduct another R-value test based on the R matrix comprising the updated basis vector.

19. The apparatus of claim 17, further comprising:

a lattice reduced R matrix determiner configured to determine the R matrix corresponding to the R-value lower than the threshold value to be the lattice reduced R matrix in response to the R-value being less than the threshold value.

* * * * *